United States Patent
Bush

(10) Patent No.: US 9,464,253 B2
(45) Date of Patent: Oct. 11, 2016

(54) COAL ADDITIVE FOR IMPROVED FURNACE OPERATION

(71) Applicant: The Lubrizol Corporation, Wickliffe, OH (US)

(72) Inventor: James H. Bush, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 877 days.

(21) Appl. No.: 13/846,963

(22) Filed: Mar. 19, 2013

(65) Prior Publication Data

US 2013/0260322 A1    Oct. 3, 2013

Related U.S. Application Data

(60) Provisional application No. 61/615,926, filed on Mar. 27, 2012.

(51) Int. Cl.
| | | |
|---|---|---|
| *B32B 9/00* | (2006.01) | |
| *C10L 9/10* | (2006.01) | |
| *F23J 7/00* | (2006.01) | |
| *C09K 3/22* | (2006.01) | |

(52) U.S. Cl.
CPC .. *C10L 9/10* (2013.01); *F23J 7/00* (2013.01); *C09K 3/22* (2013.01)

(58) Field of Classification Search
CPC ............... C10L 9/10; F23J 7/00; C09K 3/22; B32B 9/00
USPC ............ 431/4, 12, 2, 76; 110/263, 347, 342; 428/688
See application file for complete search history.

(56) References Cited

U.S. PATENT DOCUMENTS

| | | | |
|---|---|---|---|
| 3,927,992 A | 12/1975 | Kerley | |
| 3,937,992 A * | 2/1976 | Shobert, II | H02K 35/06 310/15 |
| 6,086,647 A | 7/2000 | Rahm et al. | |
| 6,729,248 B2 * | 5/2004 | Johnson | C10L 9/10 110/342 |
| 7,101,493 B2 | 9/2006 | Colucci | |
| 8,124,036 B1 * | 2/2012 | Baldrey | C01G 13/04 423/107 |
| 8,293,196 B1 * | 10/2012 | Baldrey | C01G 13/04 423/107 |
| 2002/0066394 A1 | 6/2002 | Johnson et al. | |
| 2003/0027014 A1 * | 2/2003 | Johnson | C10L 9/10 428/688 |
| 2009/0214992 A1 * | 8/2009 | McKnight | F23D 1/00 431/12 |

FOREIGN PATENT DOCUMENTS

CN            101497840 A        8/2009

* cited by examiner

*Primary Examiner* — Gregory Huson
*Assistant Examiner* — Nikhil Mashruwala
(74) *Attorney, Agent, or Firm* — Iken S. Sans; Teresan W. Gilbert; Christopher D. Hilker

(57) ABSTRACT

The invention relates to methods of combusting coal containing fuel streams where a coal additive composition is used to improve the combustion of the coal. The invention also relates to the additive composition used in the described methods, and the use of the additive composition as a coal combustion improver.

12 Claims, No Drawings

US 9,464,253 B2

COAL ADDITIVE FOR IMPROVED FURNACE OPERATION

CROSS REFERENCE TO RELATED APPLICATION

This application claims priority from Provisional Application Ser. No. 61/615,926 filed on March 2012.

FIELD OF THE INVENTION

The invention relates to methods of combusting coal containing fuel streams where a coal additive composition is used to improve the combustion of the coal. The invention further relates to methods of operating a coal fired furnace and methods of improving the combustion efficiency of a coal fired furnace, by use of an additive composition. The invention also relates to the additive composition used in the described methods, and the use of the additive composition as a coal combustion improver.

BACKGROUND OF THE INVENTION

Coal is a main energy source for generating electricity, in the United States and throughout the world. Over six billion tons of coal are consumed per year. If the efficiency of the combustion of coal could be improved even by only a small percentage, or even a fraction of a percentage, the savings in tons of coal per year and/or the resulting increase in energy generation, could be significant.

There is a continuing, never-ending need to improve the efficiency of our energy generation and to reduce waste of natural resources such as coal. Less efficient combustion of coal is efficiently a waste of a natural resource and improving the efficiency of the combustion of coal reduces the amount of waste generated per ton of coal consumed, increases the amount of energy generated per ton of coal consumed, and/or improves the operation of the coal-fueled furnace where the coal is consumed. There is a need for improved methods of operating such furnaces to improve the combustion of coal.

SUMMARY OF THE INVENTION

The present invention deals with a method of combusting coal, where the method includes the steps of: (I) providing a coal containing feed material to a coal combustion chamber; and (II) contacting the feed material with a coal additive comprising a zinc containing compound. The coal containing feed is combusted in the coal combustion chamber, and the invention results in an improvement in the combustion of the coal.

The invention further provides for a method of improving the combustion efficiency of a coal fired furnace comprising the steps of: (I) providing a coal containing feed material to a coal combustion chamber; (II) contacting the feed material with a coal additive comprising a zinc containing compound; whereby the efficiency of the combustion of the coal in the coal containing feed material is improved.

In some embodiments, the described methods involve: (I) providing a coal containing feed material to a coal combustion chamber; (II) providing a coal additive comprising a zinc containing compound to the coal combustion chamber; (III) contacting the coal containing feed material and the coal additive in the coal combustion chamber; whereby the coal in the coal containing feed material is combusted.

In other embodiments, the methods involve: (I) providing a coal containing feed material to a coal combustion chamber; (II) providing a coal additive comprising a zinc containing compound to the coal combustion chamber; whereby the coal in the coal containing feed material is combusted.

The invention provides for the described methods where the coal combustion chamber is part of a cyclone furnace and where the coal containing feed material includes coal particles entrained in an oxygen-containing gas and the coal particles have a $P_{90}$ size of no more than about 0.25 inches.

The methods of the invention also provide for the coal additive further including a mineralizer, a flow aid, an abrasive material, or a combination thereof.

The invention also provides the use the described zinc containing compound as a combustion improver in a coal fired furnace. In the described uses, the zinc containing compound may be added to the coal combustion chamber, where it contacts a coal containing feed material during combustion.

DETAILED DESCRIPTION OF THE INVENTION

Various preferred features and embodiments will be described below by way of non-limiting illustration.

The present invention deals with methods of combusting coal containing fuel streams where a coal additive composition is used to improve the combustion of the coal. The invention further relates to methods of operating a coal fired furnace and methods of improving the combustion efficiency of a coal fired furnace, by use of an additive composition. The invention also relates to the additive composition used in the described methods, and the use of the additive composition as a coal combustion improver.

The coal combustion chamber is part of a coal-fired furnace. The coal fired furnaces, and the combustion chambers thereof, suitable for use in the present invention are not overly limited. The furnace can be of any configuration. In some embodiments, the furnace is a slag-type furnace. In some of these embodiments, the furnace is a cyclone furnace.

The coal containing feed material suitable for use in the present invention is also not overly limited. Any coal containing feed material suitable for use in the described coal fired furnaces, and the combustion chambers thereof, may be used in the methods described herein.

The coal containing feed material can be described as having coal as the primary component. As used herein, "coal" refers to macromolecular network comprised of groups of carbocyclic groups, for example, polynuclear aromatic rings, to which may be attached subordinate rings connected by oxygen, sulfur and aliphatic bridges. Coal comes in various grades including peat, lignite, sub-bituminous coal and bituminous coal. In one process configuration, the coal includes less than about 15 weight percent on a dry basis of the coal containing feed material sulfur while the coal ash contains less than about 10 weight percent on a dry basis of the ash iron as $Fe_2O_3$, and at least about 15 weight percent calcium as CaO on a dry basis of the ash. The material is preferably in the form of a free flowing particulate having a P90 size of no more than about 0.25 inches.

In some embodiments, the coal containing feed material comprises ash and is less than about 1.5, 1.0, 0.5, or even 0.1 weight percent on a dry basis of the coal containing feed material sulfur. In some embodiments, the ash of the coal containing feed material comprises less than about 25, 20, 15 or even 10 weight percent on a dry basis of the ash iron.

In some embodiments, the ash of the coal containing feed material comprises less than about 10, 5, 1 or even 0.5 weight percent on a dry basis of the ash alkali, such as alkaline earth, for example calcium.

In some embodiments, the coal containing feed material is free of any iron-containing additives or compounds, and the only iron present in the coal containing feed material is from a natural source, not purposefully added to the coal. In some embodiments, the coal containing feed material and coal additive of the present invention are both free of any purposefully added iron-containing additive.

The Methods

The present invention provides a method for combusting coal, comprising the steps of: (I) providing a coal containing feed material to a coal combustion chamber; and (II) contacting the feed material with a coal additive comprising a zinc containing compound; whereby coal in the coal containing feed material is combusted.

The present invention provides a method of operating a coal fired furnace, comprising the steps of: (I) providing a coal containing feed material to a coal combustion chamber; and (II) contacting the feed material with a coal additive comprising a zinc containing compound; whereby coal in the coal containing feed material is combusted.

The present invention provides a method of improving the combustion efficiency of a coal fired furnace, comprising the steps of: (I) providing a coal containing feed material to a coal combustion chamber; and (II) contacting the feed material with a coal additive comprising a zinc containing compound; whereby coal in the coal containing feed material is combusted.

In any of these described methods, the steps may also be described as: (I) providing a coal containing feed material to a coal combustion chamber; (II) providing a coal additive comprising a zinc containing compound to the coal combustion chamber; (III) contacting the coal containing feed material and the coal additive in the coal combustion chamber. The steps may also be described as: (I) providing a coal containing feed material to a coal combustion chamber; (II) providing a coal additive comprising a zinc containing compound to the coal combustion chamber; whereby coal in the coal containing feed material is combusted.

In any of these described methods, the coal additive must be supplied to the combustion chamber, along with the coal containing feed material. The coal additive can be contacted with the coal containing feed material in a number of different ways. For example, the additive can be mixed with the coal feed at a shipping terminal, added to the coal reclaim belt, added to the coal bunkers, and/or added to the coal feed and/or primary air streams using an eductor to aspirate the additive.

While the means of supplying the coal additive to the combustion chamber is not overly limited, in some embodiments, it can be advantageous to supply the coal additive to the combustion chamber independently of the fuel. In other words, in some embodiments, the coal additive does not come into contact with the coal until after it is supplied to the combustion chamber.

The methods and additives of the present invention can have a number of advantages compared to conventional systems. The additive can provide a slag layer in the furnace having the desired viscosity and thickness at a lower operation temperature. As a result, there is more bottom ash to sell, a relatively low flyash carbon content, more effective combustion of the coal, more reliable slag tapping, improved boiler heat transfer, and a relatively low amount of entrained particulates in the offgas from combustion, leading to little or no degradation in performance of particulate collectors (due to the increased particulate load). The boiler can operate at lower power loads (e.g., 60 MW without the additive and only 35 MW with the additive as set forth below) without freezing the slag tap and risking boiler shutdown. The operation of the boiler at a lower load (and more efficient units can operate at higher load) when the price of electricity is below the marginal cost of generating electricity, can save on fuel costs. The additive can reduce the occurrence of flames in the main furnace, lower furnace exit temperatures (or steam temperatures), and decrease the incidence of convective pass fouling compared to existing systems. The additive can have little, if any, sulfur, thereby not adversely impacting sulfur dioxide emissions. The invention can also allow for the furnace being operated at lower levels of excess air, without hurting the overall combustion efficiency. By reducing the levels of excess air, the levels of polluting emissions, such as NOx emission, can be reduced. These and other advantages will become evident from the following discussion.

In any of the described methods, the coal additive may be added to the combustion chamber of the furnace in such amounts such that the metal of the zinc containing compound is present in the combustion chamber at a concentration of from about 5 to about 1000 ppm relative to the total amount of coal containing feed material present in the combustion chamber. In other embodiments, the coal additive may be added to provide an effective concentration of 5 or 10 up to 1000, from 24 up to 500, from 50 up to 250, or even from 75 up to 150 or 100 ppm. By effective concentration it is meant the concentration provided for by having the specified amount, or addition rate, of coal additive into the combustion chamber when considering the amount, or addition rate, of coal containing feed material into the combustion chamber. In some embodiments, the amounts of additive used may instead be described by the injection rate of the additive. The injection rate of the coal additive to the combustion chamber can range from about 10 to about 50 pounds of additive per ton coal and more typically from about 10 to about 20 pounds of additive per ton coal.

The Coal Additive

The coal additive of the present invention, which may perhaps more accurately be described as an additive to be used to improve the combustion of coal, includes a zinc containing compound. In some embodiments, the zinc containing compound is a zinc carboxylate.

Suitable zinc carboxylates for use in the present invention include mono- or multi-carboxylic compounds. As used herein, the term "zinc carboxylate" includes carboxy containing sulfo compounds salted with zinc, for example, zinc salted sulfosuccinates.

Suitable specific zinc carboxylates include, for example, zinc succinates, zinc oleates, zinc acetates, zinc acetylacetonates, zinc hexanoates, zinc hydrogen tartrates, zinc tartrates, zinc palmitates, zinc phthalates, zinc thioacetates, and combinations thereof. In one embodiment, the one or more metal carboxylates are selected from the group consisting of zinc oleates, zinc succinates, and combinations thereof.

In some embodiments, the zinc carboxylates are limited by the additional proviso that they be at least somewhat soluble and/or dispersible in fuel and/or a diluent and/or solvent of some kind.

Zinc carboxylates may be prepared by reacting a zinc oxide and a fatty carboxylic acid. Suitable fatty carboxylic acids are not overly limited. As noted above. In some embodiments, the fatty carboxylic acids are fatty monocarboxylic acids. In some embodiment, the fatty carboxylic acids contain from 1 to 40, or from 2 to 20, or from 2 to 18, or from 12 to 20 carbon atoms. In some embodiments, the fatty carboxylic acid comprises acetic acid, propionic acid, oleic acid, napthenic acid, tall oil fatty acid, or any combination thereof.

In some embodiments, the zinc containing compound is a zinc oleate derived from zinc oxide and oleic acid.

The coal additives of the present invention may be mixed with an oil of lubricating viscosity to form an additive concentrate, which allows for easier handling of the additive, making it more readily pumpable, etc.

The coal additives of the present invention may also include one or more additional additives. These additional additives are not overly limited and include any additives know to be useful in coal fired furnaces. Suitable additional additives include mineralizers, flow aids, abrasive materials, or any combination thereof. In some embodiments, the additional additives may be metal containing compounds, for examples metal borates or metal carboxylates, and these materials may contain iron, calcium, manganese, magnesium, or some combination thereof. In some embodiments, the additives of the invention further include one or more other metal carboxylates, one or more hydrocarbyl substituted nitrogen containing additives or borated derivatives thereof, one or more alkoxylate detergents, one or more a metal containing detergents, (e) one or more alkyl borates, or some combination thereof.

As used herein, a "flow aid" refers to any substance that reduces particle-to-particle attraction or sticking, such as through electrostatic or mechanical means. Preferred flow aids include ethylene glycol, "GRIND AIDS" manufactured by WR Grace Inc. The preferred amount of flow aid in the additive is at least about 1 and no more than about 10 weight percent (dry basis) and more preferably at least about 1 and no more than about 5 weight percent (dry basis).

Suitable mineralizing agents include zinc oxides and zinc sulfide. It is noted that these mineralizing agents are different from the zinc-contain additives described above, which may be derived from zinc oxide, but which do not include zinc oxide itself.

Abrasive materials can also be used to prevent deposit formation and/or life. As will be appreciated, abrasive materials will remove deposits from the conduit walls through abrasion. Any abrasive material may be employed, with preferred materials being sand, blasting grit, and/or boiler slag. The preferred amount of abrasive material in the additive is at least about 2 and no more than about 20 weight percent (dry basis) and more preferably at least about 2 and no more than about 10 weight percent (dry basis).

The invention also provides for the use of the describe zinc containing compound as a combustion improver in a coal fired furnace, where the zinc containing compound is added to a coal combustion chamber, where it contacts a coal containing feed material during combustion.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, in some embodiments no more than one, non-hydrocarbon substituent will be present for every ten carbon atoms in the hydrocarbyl group; typically, there will be no non-hydrocarbon substituents in the hydrocarbyl group. As used herein, the term "hydrocarbonyl group" or "hydrocarbonyl substituent" means a hydrocarbyl group containing a carbonyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples. While the Examples are provided to illustrate the invention, they are not intended to limit it.

A conversion and environmental process simulator (CEPS) designed to burn coal is used to demonstrate the benefits of the invention. The process simulator is an intermediate-scale down fired combustor that simulates conditions of a full scale utility boiler including combustion. All of the testing described below uses the same CEPS operated, at the same combustion conditions, using the same coal. The testing includes a baseline (Example 1) where the coal is burned without the presence of a coal additive composition. The testing also includes an inventive example (Example 2) where the coal is burned with the presence of a coal additive composition, but where all other parameters are the same as in Example 1.

The coal additive composition for Example 2 is prepared by mixing a zinc carboxylate into diluent oil so that the resulting mixture is 5.1 percent by weight zinc carboxylate. For Example 2 the coal additive composition is added to the combustion zone of the CEPS at a rate to deliver 100 ppm (wt/wt) zinc to the coal feed.

During the Example 1 and Example 2 tests, unburned coal in the fly ash is measured to evaluate the efficiency of the combustion. This data is used to calculate grams of unburned carbon per hour, which when considered with the coal carbon flow rate, can be used to calculate combustion efficiency. The results from the testing are summarized below:

TABLE 1

CEPS Test Data

|  | Example 1 | Example 2 |
|---|---|---|
| Fly Ash Carbon (wt %) | 17.3 | 0.71 |
| Coal Carbon Flow (kg/hr) | 0.702 | 0.649 |
| Unburned Carbon (g/hr) | 0.241 | 0.007 |
| Combustion Efficiency (%) | 99.9657 | 99.9989 |

The results show the invention provides a significant improvement in combustion efficiency. While an improvement from 99.9657% efficiency to 99.9989% efficiency may seem small, given the volumes involved, the improvement is significant. As noted above, over six billion tons of coal are consumed annually. An improvement of 0.0332% represents just under 2 million tons of coal a year that would not be wasted or, stated differently, just over 330,000 tons of coal saved for every billion tons of coal burned, thus a significant savings in coal and a significant reduction in possible pollution from unburned coal.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Except where otherwise indicated, all numerical quantities in the description specifying amounts or ratios of materials are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A method for combusting coal, comprising the steps of:
   (I) providing a coal containing feed material to a coal combustion chamber, wherein the coal containing feed material comprises:
      (a) less than about 15 percent by weight sulfur, taken on a dry basis of the coal containing feed material; and
      (b) ash, with the ash containing less than about 25 percent by weight iron and at least about 10 percent by weight alkali metal, taken on a dry basis of the ash;
   (II) contacting the feed material with a coal additive comprising a zinc containing compound;
   whereby coal in the coal containing feed material is combusted.

2. The method of claim 1, wherein the coal combustion chamber is part of a cyclone furnace and wherein the coal containing feed material includes coal particles entrained in an oxygen-containing gas and the coal particles have a $P_{90}$ size of no more than about 0.25 inches.

3. The method of claim 1 wherein the coal additive further comprises a mineralizer, a flow aid, an abrasive material, or a combination thereof.

4. The method of claim 1 wherein the coal additive is added to the combustion chamber of the furnace in such amounts such that the metal of the zinc containing compound is present in a concentration of from about 5 to about 1000 ppm relative to the total amount of coal containing feed material.

5. The method of claim 1, wherein the zinc containing compound contains a zinc carboxylate additive comprising the reaction product of a zinc oxide and a fatty carboxylic acid.

6. The method of claim 5 wherein the fatty carboxylic acid comprises acetic acid, propionic acid, oleic acid, napthenic acid, tall oil fatty acid, or any combination thereof.

7. A method of improving the combustion efficiency of a coal fired furnace comprising the steps of:
   (I) providing a coal containing feed material to a coal combustion chamber, wherein the coal containing feed material comprises:
      (a) less than about 15 percent by weight sulfur, taken on a dry basis of the coal containing feed material; and
      (b) ash, with the ash containing less than about 25 percent by weight iron and at least about 10 percent by weight alkali metal, taken on a dry basis of the ash;
   (II) contacting the feed material with a coal additive comprising a zinc containing compound;
   whereby the efficiency of the combustion of the coal in the coal containing feed material is improved.

8. The method of claim 7, wherein the coal combustion chamber is part of a cyclone furnace and wherein the coal containing feed material includes coal particles entrained in an oxygen-containing gas and the coal particles have a $P_{90}$ size of no more than about 0.25 inches.

9. The method of claim 7 wherein the coal additive further comprises a mineralizer, a flow aid, an abrasive material, or a combination thereof.

10. The method of claim 7 wherein the coal additive is added to the combustion chamber of the furnace in such amounts such that the metal of the zinc containing compound is present in a concentration of from about 5 to about 1000 ppm relative to the total amount of coal containing feed material.

11. The method of claim 7 wherein the zinc containing compound contains a metal carboxylate additive comprising the reaction product of a zinc oxide and a fatty carboxylic acid.

12. The method of claim 7 wherein the fatty carboxylic acid comprises acetic acid, propionic acid, oleic acid, napthenic acid, tall oil fatty acid, or any combination thereof.

* * * * *